United States Patent
Nakano et al.

(10) Patent No.: US 12,104,862 B2
(45) Date of Patent: Oct. 1, 2024

(54) HEAT EXCHANGER AND AIR-CONDITIONING APPARATUS

(71) Applicant: DAIKIN INDUSTRIES, LTD., Osaka (JP)

(72) Inventors: Hiroyuki Nakano, Osaka (JP); Atsushi Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/618,303

(22) Filed: Mar. 27, 2024

(65) Prior Publication Data

US 2024/0240869 A1 Jul. 18, 2024

Related U.S. Application Data (63) Continuation of application No. PCT/JP2022/033225, filed on Sep. 5, 2022.

(30) Foreign Application Priority Data

Sep. 30, 2021 (JP) .................. 2021-160771

(51) Int. Cl.
*F28D 7/16* (2006.01)
(52) U.S. Cl.
CPC .................. *F28D 7/163* (2013.01)
(58) Field of Classification Search
CPC ... F28D 7/163; F16L 25/14; F28F 1/32; F28F 9/262

(Continued)

(56) References Cited

U.S. PATENT DOCUMENTS 5,584,340 A * 12/1996 Derosier ............... F28F 9/0131
165/149
10,746,445 B2 * 8/2020 Kim ..................... F25B 41/20
(Continued)

FOREIGN PATENT DOCUMENTS

CN 2914607 Y * 6/2007
CN 213207745 U * 5/2021 ............. F21V 17/06
(Continued)

OTHER PUBLICATIONS

International Preliminary Report on Patentability issued in International Application No. PCT/JP2022/033225, mailed Apr. 11, 2024 (5 pages).

(Continued)

*Primary Examiner* — Jon T. Schermerhorn, Jr.
(74) *Attorney, Agent, or Firm* — Osha Bergman Watanabe & Burton LLP (57) ABSTRACT

A heat exchanger includes: a fin group including plate-shaped fins; heat transfer tubes penetrating the plate-shaped fins; and a support plate at an end of the fin group. The heat transfer tubes penetrate the support plate. The heat exchanger is configured to cause a heat medium flowing through the heat transfer tubes to exchange heat with air. End portions of the heat transfer tubes form protrusions protruding from the support plate. The protrusions include: a first protrusion connected to one of the protrusions adjacent to the first protrusion; and a second protrusion connected to a flow path pipe different from one of the protrusions adjacent to the second protrusion. A distance from a tip end of the second protrusion to the support plate is shorter than a distance from a tip end of the first protrusion to the support plate.

10 Claims, 10 Drawing Sheets

(58) Field of Classification Search
USPC .......................................................... 165/173
See application file for complete search history.

(56) References Cited

U.S. PATENT DOCUMENTS

| | | | | |
|---|---|---|---|---|
| 11,460,129 B2 * | 10/2022 | Jin | ..................... | F16L 13/141 |
| 2016/0061536 A1 | 3/2016 | Arment et al. | | |

FOREIGN PATENT DOCUMENTS

| | | | | | |
|---|---|---|---|---|---|
| JP | S60-139191 | U | | 9/1985 | |
| JP | H09-243291 | A | | 9/1997 | |
| JP | 2004020174 | A | * | 1/2004 | ............... F28F 1/28 |
| JP | 2010243078 | A | * | 10/2010 | ........... F28D 1/0475 |
| JP | 2015-64159 | A | | 4/2015 | |
| JP | 2017-201220 | A | | 11/2017 | |
| JP | 2019-81186 | A | | 5/2019 | |
| KR | 20200051946 | A | | 5/2020 | |
| WO | 2013/118762 | A1 | | 8/2013 | |

OTHER PUBLICATIONS

Decision to Grant a Patent issued in Japanese Application No. 2021-160771 mailed Oct. 4, 2022 (5 pages).
International Search Report issued in International Application No. PCT/JP2022/033225 mailed Oct. 11, 2022 (2 pages).
Written Opinion issued in International Application No. PCT/JP2022/033225 mailed Oct. 11, 2022 (3 pages).

* cited by examiner

HEAT EXCHANGER AND AIR-CONDITIONING APPARATUS

TECHNICAL FIELD

The present disclosure relates to a heat exchanger and an air-conditioning apparatus.

BACKGROUND

Patent Document 1 discloses a heat exchanger that causes refrigerant to exchange heat with air. This heat exchanger includes plate-shaped fins and a heat transfer tube formed in a hairpin shape (long U-shape). In this heat exchanger, a fin group including many fins arranged at regular intervals is formed, and a plurality of heat transfer tubes penetrates each fin forming the fin group. An end portion of each heat transfer tube protrudes from the fin group.

A U-shaped tube is joined to part of the end portion of each heat transfer tube protruding from the fin group. The U-shaped tube is a tube member formed in a short U-shape, and connects end portions of adjacent ones of the heat transfer tubes to each other. Further, a connection pipe is joined to another part of the end portion of each heat transfer tube protruding from the fin group. The connection pipe connects the end portion of the heat transfer tube to a member (for example, a tube for connecting the heat exchanger to another device) other than the heat transfer tube adjacent to the end portion.

PATENT LITERATURE

Patent Document 1: Japanese Unexamined Patent Publication No. 2017-201220

SUMMARY

One or more embodiments of the present disclosure are directed to a heat exchanger (30) including: a fin group (47) including a plurality of plate-shaped fins (46); a plurality of heat transfer tubes (50) penetrating the plurality of plate-shaped fins (46) of the fin group (47); and a support plate (48) provided at an end of the fin group (47) such that the plurality of heat transfer tubes (50) penetrate the support plate (48), the heat exchanger (30) being configured to cause a heat medium flowing in the heat transfer tubes (50) to exchange heat with air. In these embodiments, end portions of the plurality of heat transfer tubes (50) form protrusions (51) protruding from the support plate (48), the protrusions (51) include a first protrusion (51a) and a second protrusion (51b), the first protrusion (51a) is connected to the protrusion (51) positioned adjacent to the first protrusion (51a), the second protrusion (51b) is connected to a flow path pipe (65) different from the protrusion (51) positioned adjacent to the second protrusion (51b), and a distance from the tip end of the second protrusion (51b) to the support plate (48) is shorter than a distance from the tip end of the first protrusion (51a) to the support plate (48).

DETAILED DESCRIPTION

One or more embodiments will be described. These embodiments provide an air-conditioning apparatus (10) that conditions air in an indoor space.

—Air-Conditioning Apparatus—

<General Configuration of Air-Conditioning Apparatus>

Figure 1:
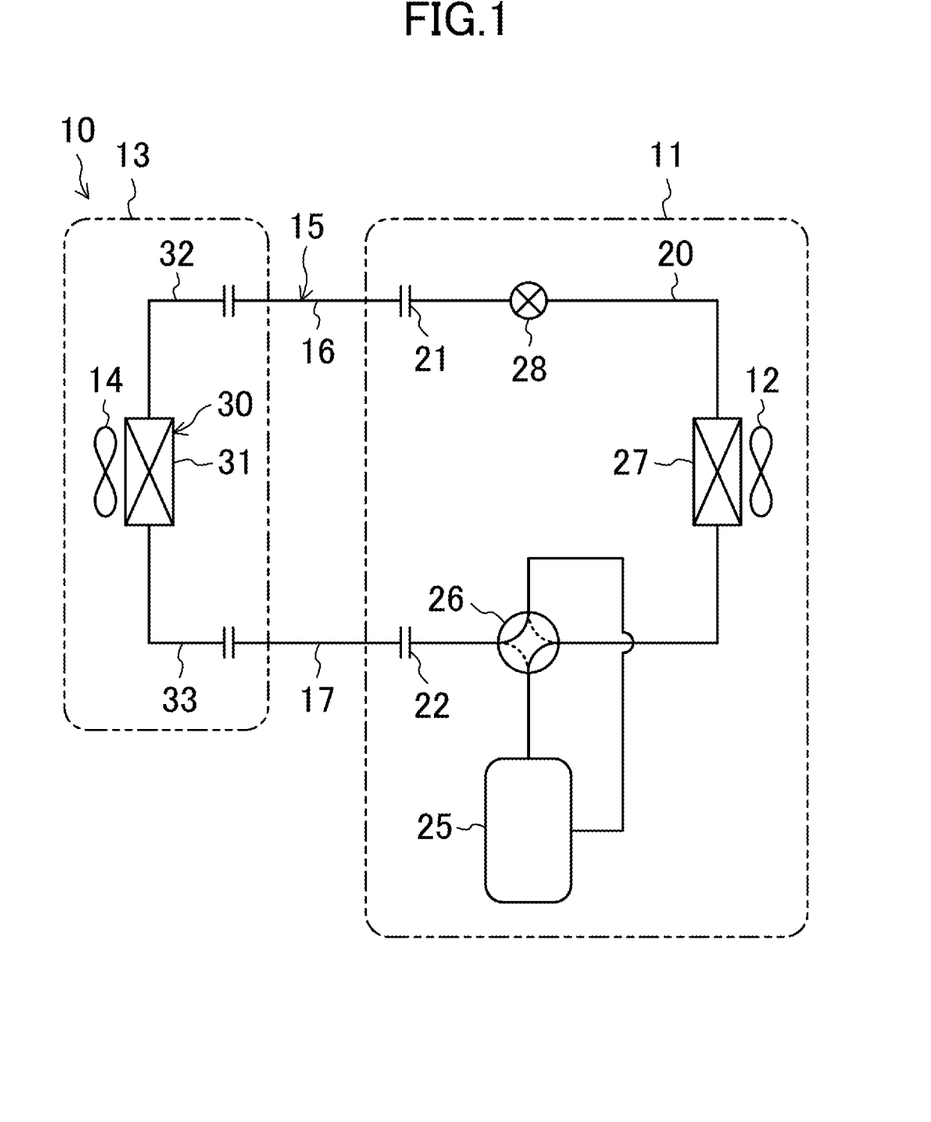
FIG. 1 is a piping system diagram illustrating a configuration of an air-conditioning apparatus of one or more embodiments.

As illustrated in FIG. 1, the air-conditioning apparatus (10) includes an outdoor unit (11) and an indoor unit (13). The outdoor unit (11) houses an outdoor circuit (20) and an outdoor fan (12). The indoor unit (13) houses an indoor heat exchanger (30) and an indoor fan (14). The outdoor unit (11) and the indoor unit (13) are connected to each other via a liquid-side connection pipe (16) and a gas-side connection pipe (17) so as to form a refrigerant circuit (15). The refrigerant circuit (15) is filled with a refrigerant which is a heat medium.

<Refrigerant Circuit>

The outdoor circuit (20) includes a compressor (25), a four-way switching valve (26), an outdoor heat exchanger (27), and an expansion valve (28). In the outdoor circuit (20), a discharge pipe and a suction pipe of the compressor (25) are connected to the four-way switching valve (26). The outdoor circuit (20) has a gas-side end (22) connected to the four-way switching valve (26). In the outdoor circuit (20), the expansion valve (28) and the outdoor heat exchanger (27) are arranged in this order from a liquid-side end (21) of the outdoor circuit (20) toward the four-way switching valve (26).

The liquid-side end (21) of the outdoor circuit (20) is connected to one end of the liquid-side connection pipe (16) via a joint. The gas-side end (22) of the outdoor circuit (20) is connected to one end of the gas-side connection pipe (17) via a joint.

The compressor (25) is of a hermetic type. The outdoor heat exchanger (27) is a so-called cross-fin heat exchanger, and causes the refrigerant in the refrigerant circuit (15) to exchange heat with outdoor air. The expansion valve (28) is a so-called electronic expansion valve. The four-way switching valve (26) is for switching between a cooling operation and a heating operation.

The indoor heat exchanger (30) includes a heat exchange unit (31), a liquid-side pipe (32), and a gas-side pipe (33). The heat exchange unit (31) is a so-called cross-fin heat exchanger, and causes the refrigerant in the refrigerant circuit (15) to exchange heat with indoor air. The heat exchange unit (31) is connected to one end of the liquid-side pipe (32) and one end of the gas-side pipe (33).

The other end of the liquid-side pipe (32) is connected to the other end of the liquid-side connection pipe (16) via a joint. The other end of the gas-side pipe (33) is connected to the other end of the gas-side connection pipe (17) via a joint.

<Operation of Air-Conditioning Apparatus>

The air-conditioning apparatus (10) selectively performs cooling operation and heating operation. In each of the cooling operation and the heating operation, the air-conditioning apparatus (10) circulates the refrigerant in the refrigerant circuit (15) to perform a refrigeration cycle.

In the cooling operation, the four-way switching valve (26) is in the state indicated by the solid line in FIG. 1, the outdoor heat exchanger (27) functions as a condenser, and the indoor heat exchanger (30) functions as an evaporator. The indoor unit (13) cools the sucked indoor air in the heat exchange unit (31) of the indoor heat exchanger (30), and blows the cooled indoor air into a room.

In the heating operation, the four-way switching valve (26) is in the state indicated by the broken line in FIG. 1, the indoor heat exchanger (30) functions as a condenser, and the outdoor heat exchanger (27) functions as an evaporator. The indoor unit (13) heats the sucked indoor air in the heat exchange unit (31) of the indoor heat exchanger (30), and blows the heated indoor air into the room.

—Indoor Unit—

Figure 2:
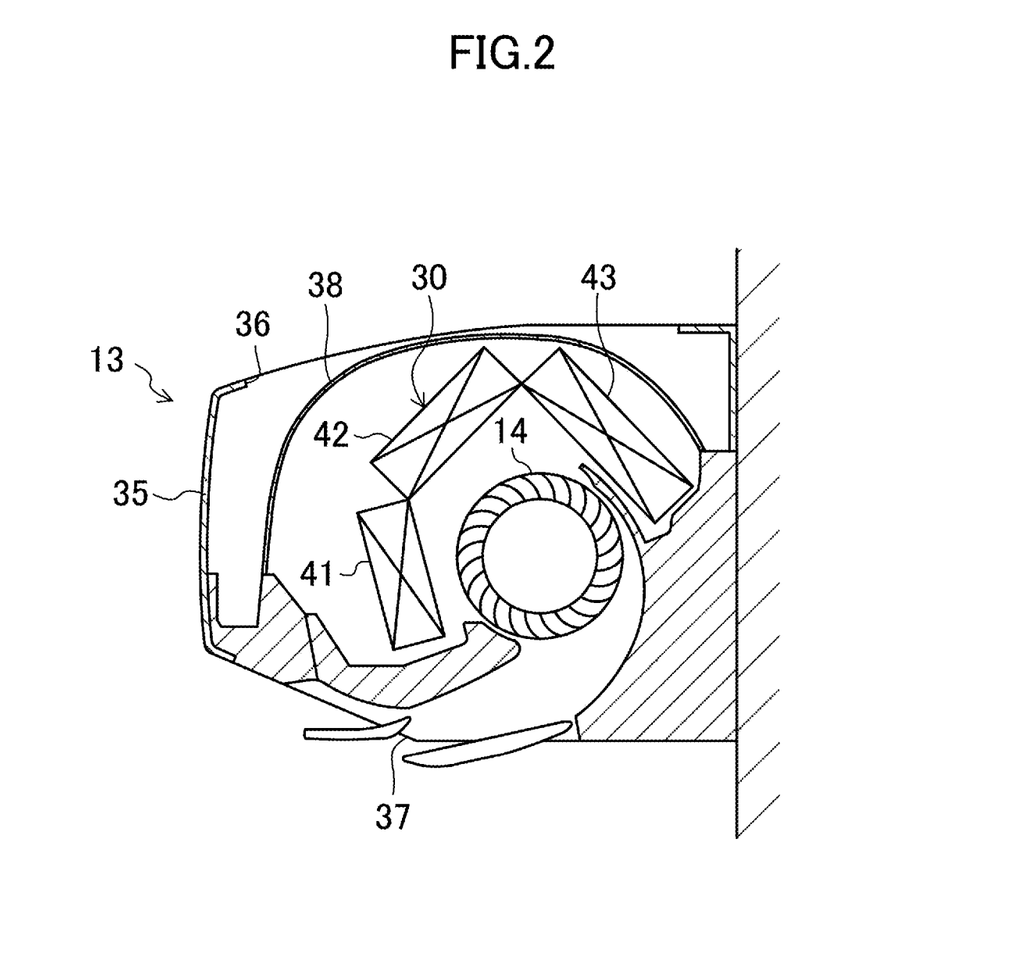
FIG. 2 is a cross-sectional view of an indoor unit illustrating a schematic configuration of an indoor unit of one or more embodiments.

As illustrated in FIG. 2, the indoor unit (13) of one or more embodiments is of a wall-mounted type.

The indoor unit (13) includes a casing (35). A suction port (36) is formed in an upper portion of the casing (35). A blow-out port (37) is formed in a lower portion of the casing (35). The casing (35) houses the indoor heat exchanger (30), the indoor fan (14), and an air filter (38). The indoor fan (14) is a so-called cross-flow fan.

The heat exchange unit (31) of the indoor heat exchanger (30) is provided from the front side to the upper side of the indoor fan (14). The heat exchange unit (31) of the indoor heat exchanger (30) includes a first heat exchange unit (41), a second heat exchange unit (42), and a third heat exchange unit (43). The first heat exchange unit (41) is positioned on the front side of the indoor fan (14). The second heat exchange unit (42) is positioned above and closer to the front of the indoor fan (14). The third heat exchange unit (43) is positioned above and closer to the back of the indoor fan (14).

—Indoor Heat Exchanger—

The indoor heat exchanger (30) will be described in detail. In the following description of the indoor heat exchanger (30), terms "upper," "lower," "right," "left," "front," and "back" refer to directions (directions illustrated in FIG. 3) when the indoor heat exchanger (30) is viewed from the front.

<General Configuration of Indoor Heat Exchanger>

Figure 3:
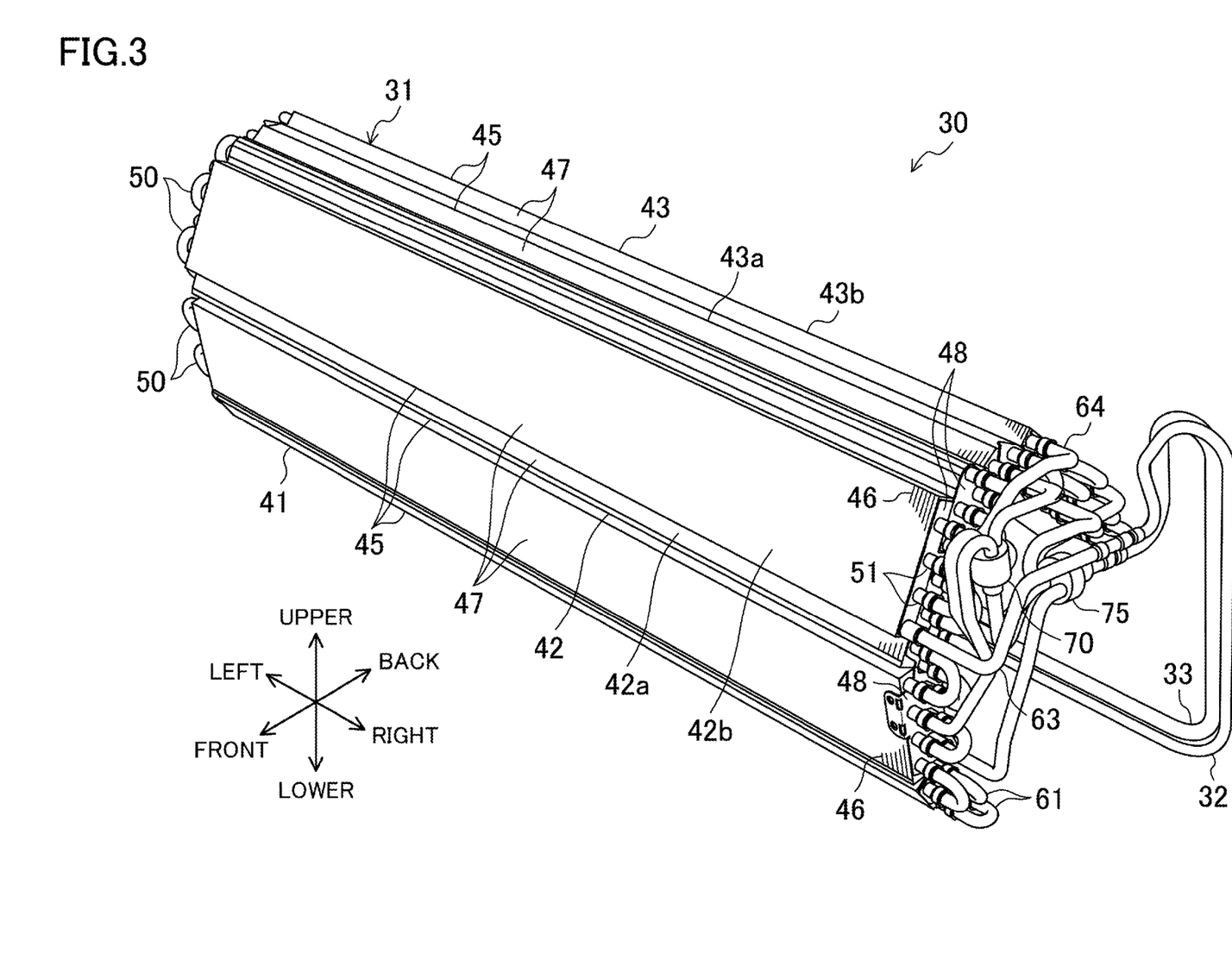
FIG. 3 is a perspective view of an indoor heat exchanger of one or more embodiments.
Figure 4:
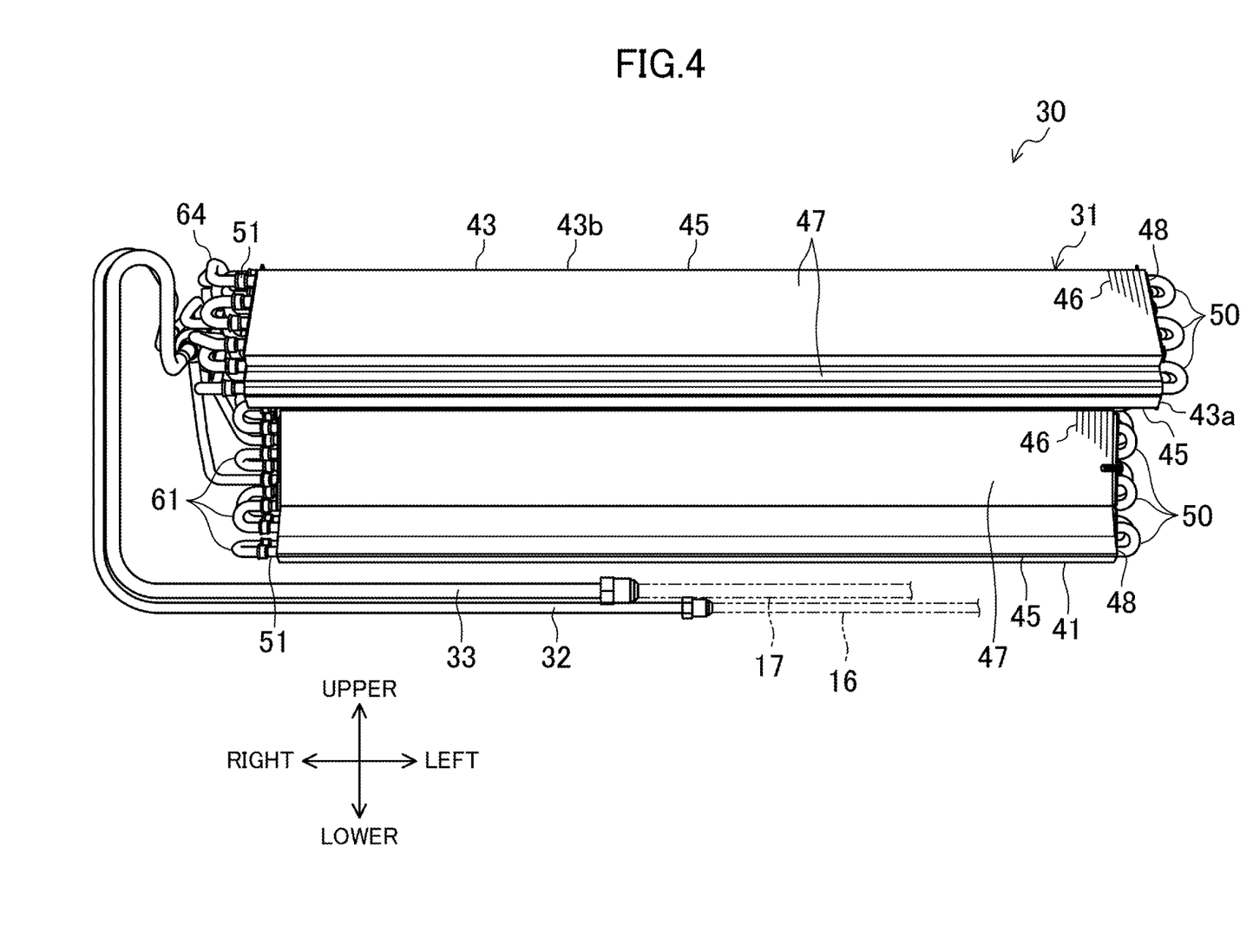
FIG. 4 is a back view of the indoor heat exchanger of one or more embodiments.

As illustrated in FIGS. 3 and 4, the indoor heat exchanger (30) includes the heat exchange unit (31), the liquid-side pipe (32), and the gas-side pipe (33).

The heat exchange unit (31) is a so-called cross-fin heat exchanger. As will be described in detail later, the heat exchange unit (31) includes a heat transfer tube (50) and a fin (46). The heat exchange unit (31) causes the refrigerant flowing through the heat transfer tubes (50) to exchange heat with air flowing in contact with the fins (46).

The liquid-side pipe (32) and the gas-side pipe (33) are pipes in which the refrigerant flows. One end of the liquid-side pipe (32) and one end of the gas-side pipe (33) are connected to the heat exchange unit (31). The other end of the liquid-side pipe (32) is connected to the liquid-side connection pipe (16) via a flare joint. The other end of the gas-side pipe (33) is connected to the gas-side connection pipe (17) via a flare joint.

Portions of the liquid-side pipe (32) and the gas-side pipe (33) closer to the other ends thereof extend in the lateral direction from the right to the left (see FIG. 4). Upon installation of the indoor unit (13), an operator may bend the liquid-side pipe (32) and the gas-side pipe (33) to change the postures of the portions closer to the other ends. In this case, the portions of the liquid-side pipe (32) and the gas-side pipe (33) closer to the other ends thereof may be in postures extending from the front to the back or from the left to the right. In this manner, the liquid-side pipe (32) and the gas-side pipe (33) are displaceable relative to the heat exchange unit (31).

<Heat Exchange Unit>

As illustrated in FIG. 3, the heat exchange unit (31) includes the first heat exchange unit (41), the second heat exchange unit (42), and the third heat exchange unit (43). Each of the first heat exchange unit (41), the second heat exchange unit (42), and the third heat exchange unit (43) includes a heat transfer tube (50), a fin (46), and a support plate (48).

The fin (46) is a thin plate-shaped member. The material of the fin (46) is aluminum alloy. In each of the first to third heat exchange units (41 to 43), many fins (46) are arranged in the right-left direction at regular intervals. In each of the first to third heat exchange units (41 to 43), the many fins (46) arranged in the right-left direction form a fin group (47).

The support plate (48) is a plate-shaped member thicker than the fin (46). The material of the support plate (48) is steel. In each of the first to third heat exchange units (41 to 43), one support plate (48) is provided at each of the right and left ends of the fin group (47). The support plate (48) is provided so as to cover the fin (46) positioned at the end of the fin group (47).

The heat transfer tube (50) is a circular tube formed in a hairpin shape (or an elongated U-shape). The material of the heat transfer tube (50) is aluminum or aluminum alloy. The outer diameter of the heat transfer tube (50) is 6 mm. Many grooves for promoting heat transfer are formed in the inner surface of the heat transfer tube (50). The bottom thickness of the heat transfer tube (50) is 0.5 mm. The values of the outer diameter and bottom thickness of the heat transfer tube (50) described herein are merely examples.

In each of the first to third heat exchange units (41 to 43), each heat transfer tube (50) penetrates the fins (46) forming the fin group (47) and the support plates (48) provided at both ends of the fin group (47). In each of the first to third heat exchange units (41 to 43), each heat transfer tube (50) is inserted through the fin group (47) from the left to the right.

In each of the first to third heat exchange units (41 to 43), the fin group (47), the heat transfer tubes (50), and the support plates (48) combined with each other form a main body (45).

In each of the first to third heat exchange units (41 to 43), an end portion of each heat transfer tube (50) protrudes from the right end of the fin group (47). A portion of the heat transfer tube (50) protruding from the right end of the fin group (47) is a protrusion (51). Each heat transfer tube (50) formed in the hairpin shape includes two protrusions (51). In each of the first to third heat exchange units (41 to 43), a plurality of protrusions (51) is arranged in the longitudinal direction of the fin (46).

In the first heat exchange unit (41), two lines of the plurality of protrusions (51) arranged in the longitudinal direction of the fin (46) are formed.

The second heat exchange unit (42) includes one main heat exchange unit (42a) and one auxiliary heat exchange unit (42b). The auxiliary heat exchange unit (42b) is arranged so as to overlap with the main heat exchange unit (42a). In the main heat exchange unit (42a), two lines of the plurality of protrusions (51) arranged in the longitudinal direction of the fin (46) are formed. In the auxiliary heat exchange unit (42b), one line of the plurality of protrusions (51) arranged in the longitudinal direction of the fin (46) is formed.

The third heat exchange unit (43) includes one main heat exchange unit (43a) and one auxiliary heat exchange unit (43b). The auxiliary heat exchange unit (43b) is arranged so as to overlap with the main heat exchange unit (43a). In the main heat exchange unit (43a), two lines of the plurality of protrusions (51) arranged in the longitudinal direction of the fin (46) are formed. In the auxiliary heat exchange unit (43b), one line of the plurality of protrusions (51) arranged in the longitudinal direction of the fin (46) is formed.

<Members Forming Refrigerant Flow Path>

Figure 5:
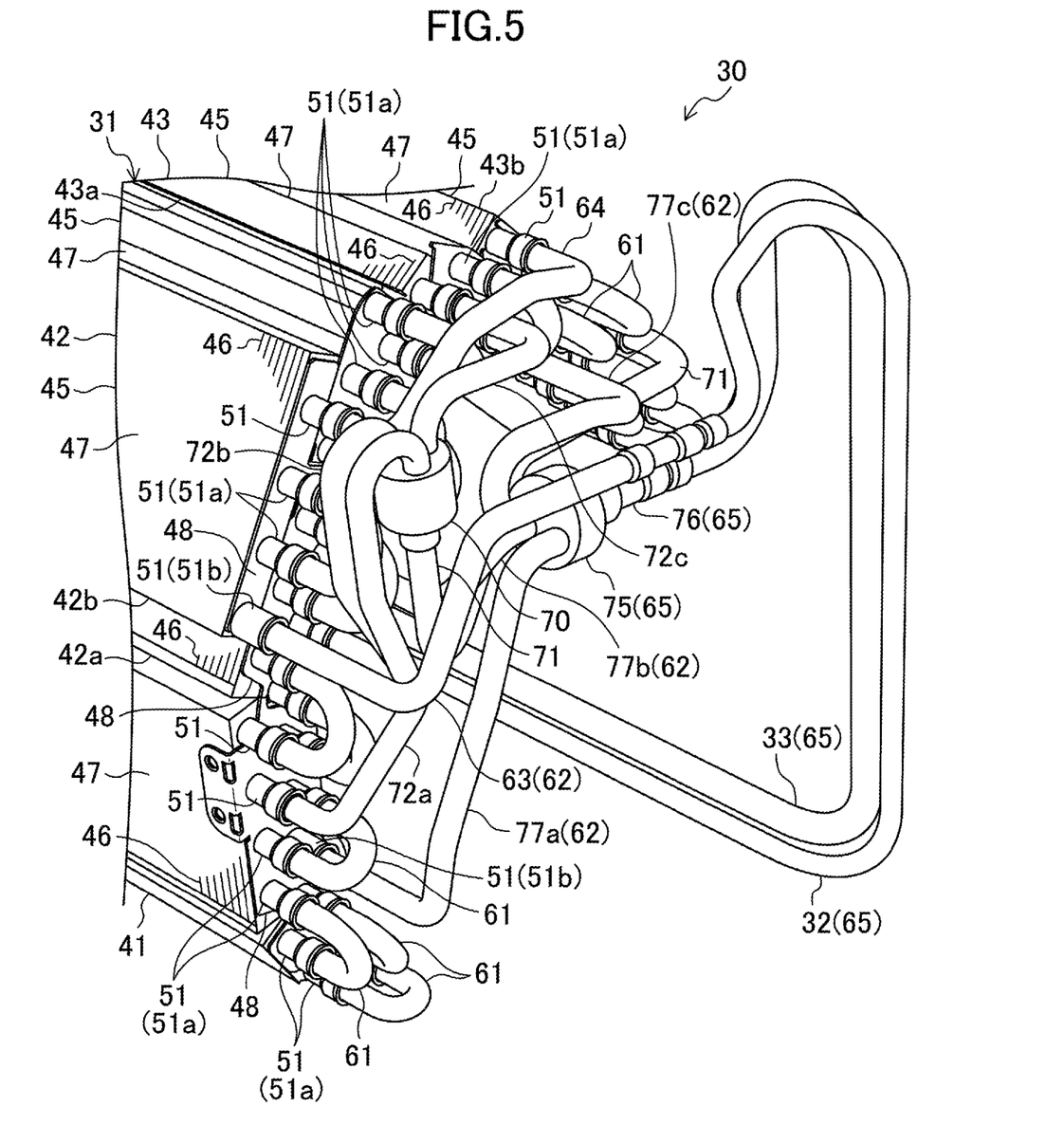
FIG. 5 is an enlarged perspective view of a main portion of the indoor heat exchanger of FIG. 3.
Figure 6:
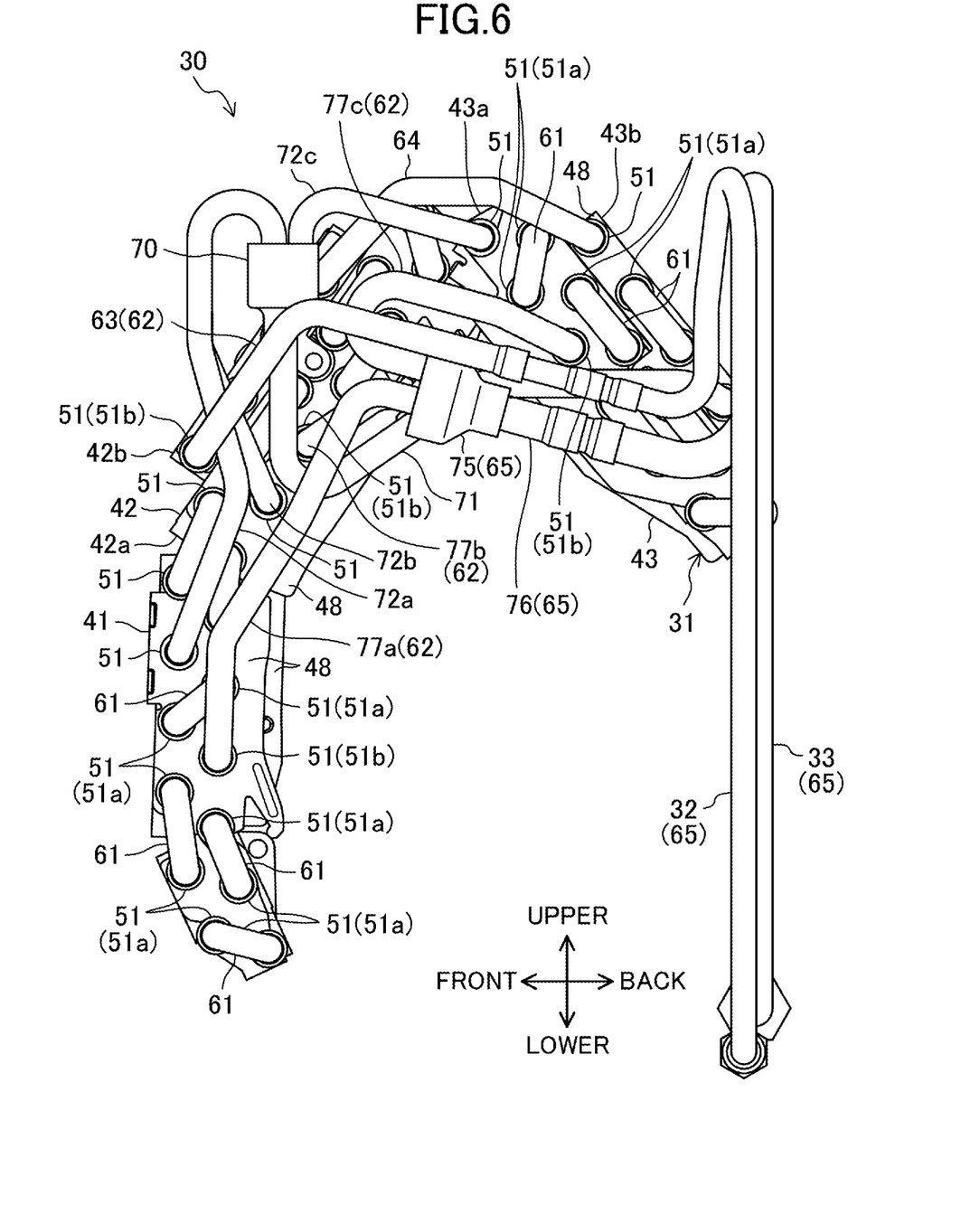
FIG. 6 is a right side view of the indoor heat exchanger of one or more embodiments.
Figure 7:
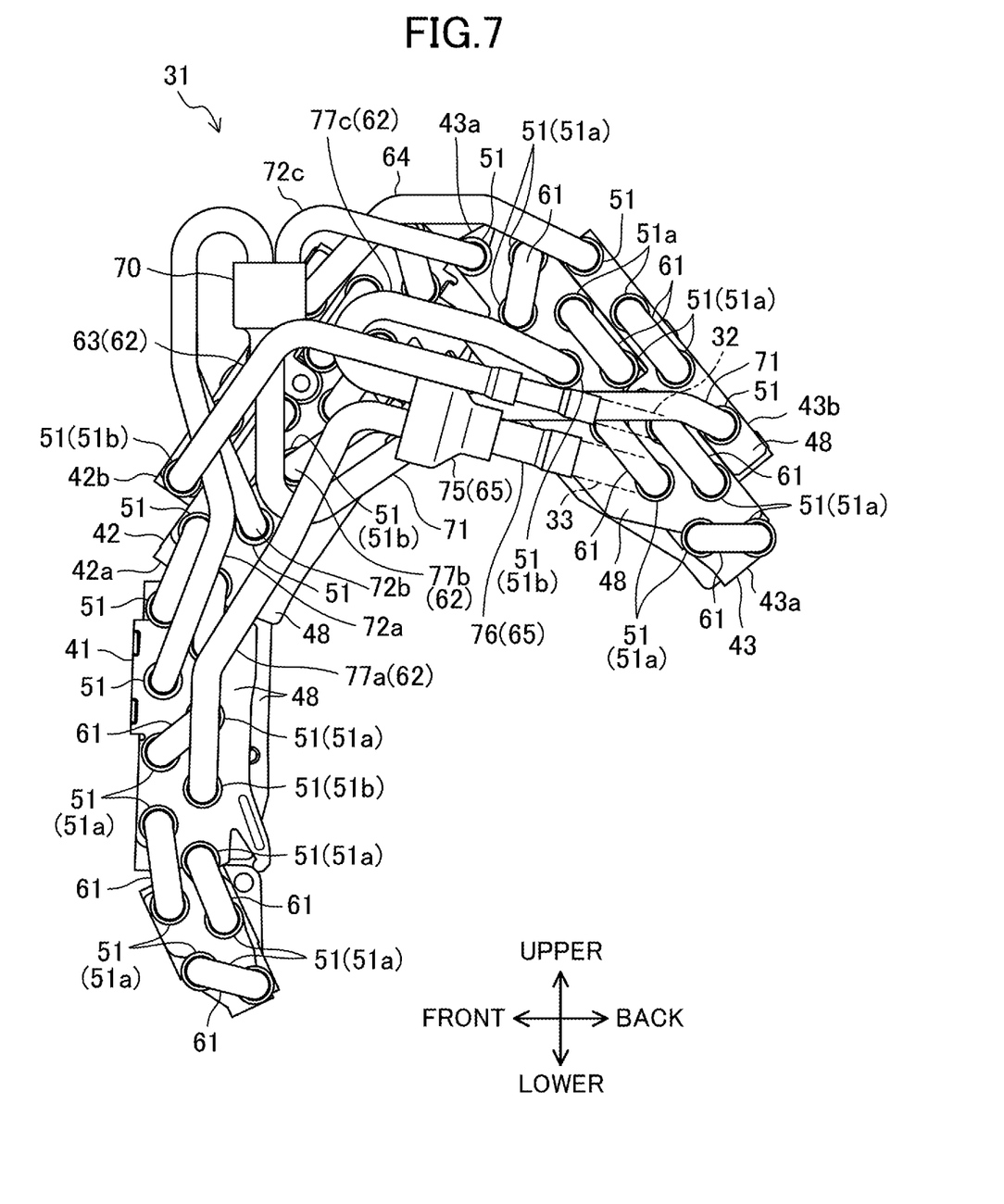
FIG. 7 is a right side view of the indoor heat exchanger with a liquid-side pipe and a gas-side pipe omitted.

As illustrated in FIGS. 5 to 7, the heat exchange unit (31) includes a U-shaped connection pipe (61), a liquid-side connection pipe (63), a bridging pipe (64), a liquid-side flow divider (70), and a gas-side flow divider (75). The heat exchange unit (31) further includes a liquid-side trunk pipe (71) and liquid-side branch pipes (72a to 72c) connected to the liquid-side flow divider (70) and a gas-side trunk pipe (76) and gas-side branch pipes (77a to 77c) connected to the gas-side flow divider (75). These members form a refrigerant flow path together with the heat transfer tubes (50).

<U-Shaped Connection Pipe>

A plurality of U-shaped connection pipes (61) is provided for each of the first to third heat exchange units (41 to 43). The U-shaped connection pipe (61) is a circular pipe curved in a U-shape. The material of the U-shaped connection pipe (61) is aluminum or aluminum alloy. The thickness of the U-shaped connection pipe (61) is, for example, about 1 mm. The thickness of the U-shaped connection pipe (61) is greater than the bottom thickness of the heat transfer tube (50).

The U-shaped connection pipe (61) is a first connection pipe connecting the protrusions (51) of adjacent ones of the heat transfer tubes (50) to each other. One end of the U-shaped connection pipe (61) is joined to one of the adjacent ones of the protrusions (51) by brazing. The other end of the U-shaped connection pipe (61) is joined to the other one of the adjacent ones of the protrusions (51) by brazing. The U-shaped connection pipe (61) connects two heat transfer tubes (50) to each other.

<Liquid-Side Connection Pipe>

The heat exchange unit (31) is provided with only one liquid-side connection pipe (63). The liquid-side connection pipe (63) is a circular pipe formed in a predetermined shape. The material of the liquid-side connection pipe (63) is aluminum or aluminum alloy. The thickness of the liquid-side connection pipe (63) is, for example, about 1 mm. The thickness of the liquid-side connection pipe (63) is greater than the bottom thickness of the heat transfer tube (50).

One end of the liquid-side connection pipe (63) is joined to one protrusion (51) provided in the auxiliary heat exchange unit (42b) of the second heat exchange unit (42). Specifically, one end of the liquid-side connection pipe (63) is joined, by brazing, to the lowermost protrusion (51) of the auxiliary heat exchange unit (42b). On the other hand, one end of the liquid-side pipe (32) is joined to the other end of the liquid-side connection pipe (63) by brazing.

The refrigerant having flowed into the heat exchange unit (31) from the liquid-side pipe (32) or the refrigerant having flowed out of the heat exchange unit (31) to the liquid-side pipe (32) flows through the liquid-side connection pipe (63). The liquid-side connection pipe (63) is a second connection pipe (62) through which the refrigerant flowing into the main body (45) of the auxiliary heat exchange unit (42b) of the second heat exchange unit (42) or the refrigerant having flowed out of the main body (45) of the auxiliary heat exchange unit (42b) flows.

<Bridging Pipe>

The heat exchange unit (31) is provided with only one bridging pipe (64). The bridging pipe (64) is a circular pipe formed in a predetermined shape. The material of the bridging pipe (64) is aluminum or aluminum alloy. The thickness of the bridging pipe (64) is, for example, about 1 mm. The thickness of the bridging pipe (64) is greater than the bottom thickness of the heat transfer tube (50).

One end of the bridging pipe (64) is joined to one protrusion (51) provided in the auxiliary heat exchange unit (42b) of the second heat exchange unit (42). Specifically, one end of the bridging pipe (64) is joined, by brazing, to the uppermost protrusion (51) of the auxiliary heat exchange unit (42b).

The other end of the bridging pipe (64) is joined to one protrusion (51) provided in the auxiliary heat exchange unit (43b) of the third heat exchange unit (43). Specifically, the other end of the bridging pipe (64) is joined, by brazing, to the uppermost protrusion (51) of the auxiliary heat exchange unit (43b).

<Liquid-Side Flow Divider, Liquid-Side Trunk Pipe, and Liquid-Side Branch Pipe>

The liquid-side flow divider (70) is a short columnar member. The liquid-side trunk pipe (71) and the liquid-side branch pipes (72a to 72c) are each a circular pipe formed in a predetermined shape. The materials of the liquid-side flow divider (70), the liquid-side trunk pipe (71), and the liquid-side branch pipes (72a to 72c) are aluminum or aluminum alloy. The thicknesses of the liquid-side trunk pipe (71) and the liquid-side branch pipes (72a to 72c) are, for example, about 1 mm. The thicknesses of the liquid-side trunk pipe (71) and the liquid-side branch pipes (72a to 72c) are greater than the bottom thickness of the heat transfer tube (50).

The liquid-side flow divider (70) is installed in such a posture that its center axis is substantially along the vertical direction. The liquid-side flow divider (70) has a function of dividing the refrigerant having flowed therein from one liquid-side trunk pipe (71) into the three liquid-side branch pipes (72a to 72c) and a function of merging the flows of refrigerant having flowed therein from the three liquid-side branch pipes (72a to 72c) and sending the merged refrigerant to one liquid-side trunk pipe (71).

One end of the liquid-side trunk pipe (71) is joined to the lower surface of the liquid-side flow divider (70) by brazing. The other end of the liquid-side trunk pipe (71) is joined to one protrusion (51) provided in the auxiliary heat exchange unit (43b) of the third heat exchange unit (43). Specifically, the other end of the liquid-side trunk pipe (71) is joined, by brazing, to the lowermost protrusion (51) of the auxiliary heat exchange unit (43b).

One end of each of the liquid-side branch pipes (72a to 72c) is joined to the upper surface of the liquid-side flow divider (70) by brazing. The other end of the first liquid-side branch pipe (72a) is joined, by brazing, to one protrusion (51) provided in the first heat exchange unit (41). The other end of the second liquid-side branch pipe (72b) is joined, by brazing, to one protrusion (51) provided in the main heat exchange unit (42a) of the second heat exchange unit (42). The other end of the third liquid-side branch pipe (72c) is joined, by brazing, to one protrusion (51) provided in the main heat exchange unit (43a) of the third heat exchange unit (43).

<Gas-Side Flow Divider, Gas-Side Trunk Pipe, and Gas-Side Branch Pipe>

The gas-side flow divider (75) is a short columnar member. The gas-side trunk pipe (76) and the gas-side branch pipes (77a to 77c) are each a circular pipe formed in a predetermined shape. The materials of the gas-side flow divider (75), the gas-side trunk pipe (76), and the gas-side branch pipes (77a to 77c) are aluminum or aluminum alloy. The thicknesses of the gas-side trunk pipe (76) and the gas-side branch pipes (77a to 77c) are, for example, about 1 mm. The thicknesses of the gas-side trunk pipe (76) and the gas-side branch pipes (77a to 77c) are greater than the bottom thickness of the heat transfer tube (50).

The gas-side flow divider (75) is installed in such a posture that its center axis is inclined diagonally to the front. The gas-side flow divider (75) has a function of dividing the refrigerant having flowed therein from one gas-side trunk pipe (76) into the three gas-side branch pipes (77a to 77c) and a function of merging the flows of refrigerant having flowed therein from the three gas-side branch pipes (77a to 77c) and sending the merged refrigerant to one gas-side trunk pipe (76).

One end of the gas-side trunk pipe (76) is joined to one end surface of the liquid-side flow divider (70) by brazing. One end of the gas-side pipe (33) is joined to the other end of the gas-side trunk pipe (76) by brazing.

One end of each of the gas-side branch pipes (77a to 77c) is joined to the other end surface of the gas-side flow divider (75) by brazing.

The other end of the first gas-side branch pipe (77a) is joined, by brazing, to one protrusion (51) provided in the first heat exchange unit (41). The first gas-side branch pipe (77a) is a second connection pipe (62) in which the refrigerant flowing into the main body (45) of the first heat exchange unit (41) or the refrigerant having flowed out of the main body (45) of the first heat exchange unit (41) flows.

The other end of the second gas-side branch pipe (77b) is joined, by brazing, to one protrusion (51) provided in the main heat exchange unit (42a) of the second heat exchange unit (42). The second gas-side branch pipe (77b) is a second connection pipe (62) in which the refrigerant flowing into the main body (45) of the main heat exchange unit (42a) of the second heat exchange unit (42) or the refrigerant having flowed out of the main body (45) of the main heat exchange unit (42a) flows.

The other end of the third gas-side branch pipe (77c) is joined, by brazing, to one protrusion (51) provided in the main heat exchange unit (43a) of the third heat exchange unit (43). The third gas-side branch pipe (77c) is a second connection pipe (62) in which the refrigerant flowing into the main body (45) of the main heat exchange unit (43a) of the third heat exchange unit (43) or the refrigerant having flowed out of the main body (45) of the main heat exchange unit (43a) flows.

<First Protrusion, Second Protrusion, Flow Path Pipe>

As described above, in the indoor heat exchanger (30), the end portion of the heat transfer tube (50) protruding from the fin group (47) forms the protrusion (51). The plurality of protrusions (51) provided in the heat exchange unit (31) of the indoor heat exchanger (30) includes a first protrusion (51a) and a second protrusion (51b).

In the indoor heat exchanger (30) of one or more embodiments, the protrusion (51) to which the U-shaped connection pipe (61) is joined is the first protrusion (51a). Each first protrusion (51a) is connected to one protrusion (51) positioned adjacent to such a first protrusion (51a) via the U-shaped connection pipe (61).

In the indoor heat exchanger (30) of one or more embodiments, the protrusion (51) to which the liquid-side connection pipe (63) is joined and the protrusion (51) to which each of the first to third gas-side branch pipes (77a to 77c) is joined are the second protrusions (51b).

The second protrusion (51b) to which the liquid-side connection pipe (63) is joined is connected to the liquid-side pipe (32) via the liquid-side connection pipe (63). The liquid-side pipe (32) is a flow path pipe (65) different from the "protrusion (51) positioned adjacent to the second protrusion (51b) to which the liquid-side connection pipe (63) is joined." One of both ends of the liquid-side pipe (32) is only connected to the second heat exchange unit (42) via the liquid-side connection pipe (63). Thus, the liquid-side pipe (32) which is the flow path pipe (65) is displaceable relative to the fin group (47) of the second heat exchange unit (42).

The second protrusions (51b) to which the respective the gas-side branch pipes (77a to 77c) are joined are connected to the gas-side flow divider (75) via the respective the gas-side branch pipes (77a to 77c). The gas-side pipe (33) is connected to the gas-side flow divider (75) via the gas-side trunk pipe (76). The gas-side flow divider (75), the gas-side trunk pipe (76), and the gas-side pipe (33) are flow path pipes (65) different from the "protrusion (51) positioned adjacent to the second protrusion (51b) to which each of the gas-side branch pipes (77a to 77c) is joined." One of both ends of the gas-side flow divider (75) is only connected to the first to third heat exchange units (41 to 43) via the gas-side branch pipes (77a to 77c). Thus, the gas-side flow divider (75), the gas-side trunk pipe (76), and the gas-side pipe (33) which are the flow path pipes (65) are displaceable relative to the fin groups (47) of the first to third heat exchange units (41 to 43).

The second protrusion (51b) to which the liquid-side connection pipe (63) is joined is included in the auxiliary heat exchange unit (42b) of the second heat exchange unit (42). The auxiliary heat exchange unit (42b) also includes the first protrusion (51a) to which the U-shaped connection pipe (61) is joined. As described above, in this auxiliary heat exchange unit (42b), one line of the plurality of protrusions (51) arranged in the longitudinal direction of the fin (46) is formed. Thus, one "line of the protrusions (51)" formed in the auxiliary heat exchange unit (42b) includes both the first protrusion (51a) and the second protrusion (51b).

The second protrusion (51b) to which the first gas-side branch pipe (77a) is joined is included in the first heat exchange unit (41). As described above, in the first heat exchange unit (41), two lines of the plurality of protrusions (51) arranged in the longitudinal direction of the fin (46) are formed. In the first heat exchange unit (41), the second protrusion (51b) is included in the "line of the protrusions (51)" positioned downstream (indoor fan (14) side) in an air flow direction. This "line of the protrusions (51)" also includes the first protrusion (51a) to which the U-shaped connection pipe (61) is joined. Thus, in the first heat exchange unit (41), one "line of the protrusions (51)" includes both the first protrusion (51a) and the second protrusion (51b).

The second protrusion (51*b*) to which the second gas-side branch pipe (77*b*) is joined is included in the main heat exchange unit (42*a*) of the second heat exchange unit (42). As described above, in this main heat exchange unit (42*a*), two lines of the plurality of protrusions (51) arranged in the longitudinal direction of the fin (46) are formed. In this main heat exchange unit (42*a*), the second protrusion (51*b*) is included in the "line of the protrusions (51)" positioned downstream (indoor fan (14) side) in the air flow direction. This "line of the protrusions (51)" also includes the first protrusion (51*a*) to which the U-shaped connection pipe (61) is joined. Thus, in the main heat exchange unit (42*a*), one "line of the protrusions (51)" includes both the first protrusion (51*a*) and the second protrusion (51*b*).

The second protrusion (51*b*) to which the third gas-side branch pipe (77*c*) is joined is included in the main heat exchange unit (43*a*) of the third heat exchange unit (43). As described above, in this main heat exchange unit (43*a*), two lines of the plurality of protrusions (51) arranged in the longitudinal direction of the fin (46) are formed. In this main heat exchange unit (43*a*), the second protrusion (51*b*) is included in the "line of the protrusions (51)" positioned downstream (indoor fan (14) side) in the air flow direction. This "line of the protrusions (51)" also includes the first protrusion (51*a*) to which the U-shaped connection pipe (61) is joined. Thus, in the main heat exchange unit (43*a*), one "line of the protrusions (51)" includes both the first protrusion (51*a*) and the second protrusion (51*b*).

<Lengths of First Protrusion and Second Protrusion>

Figure 8:
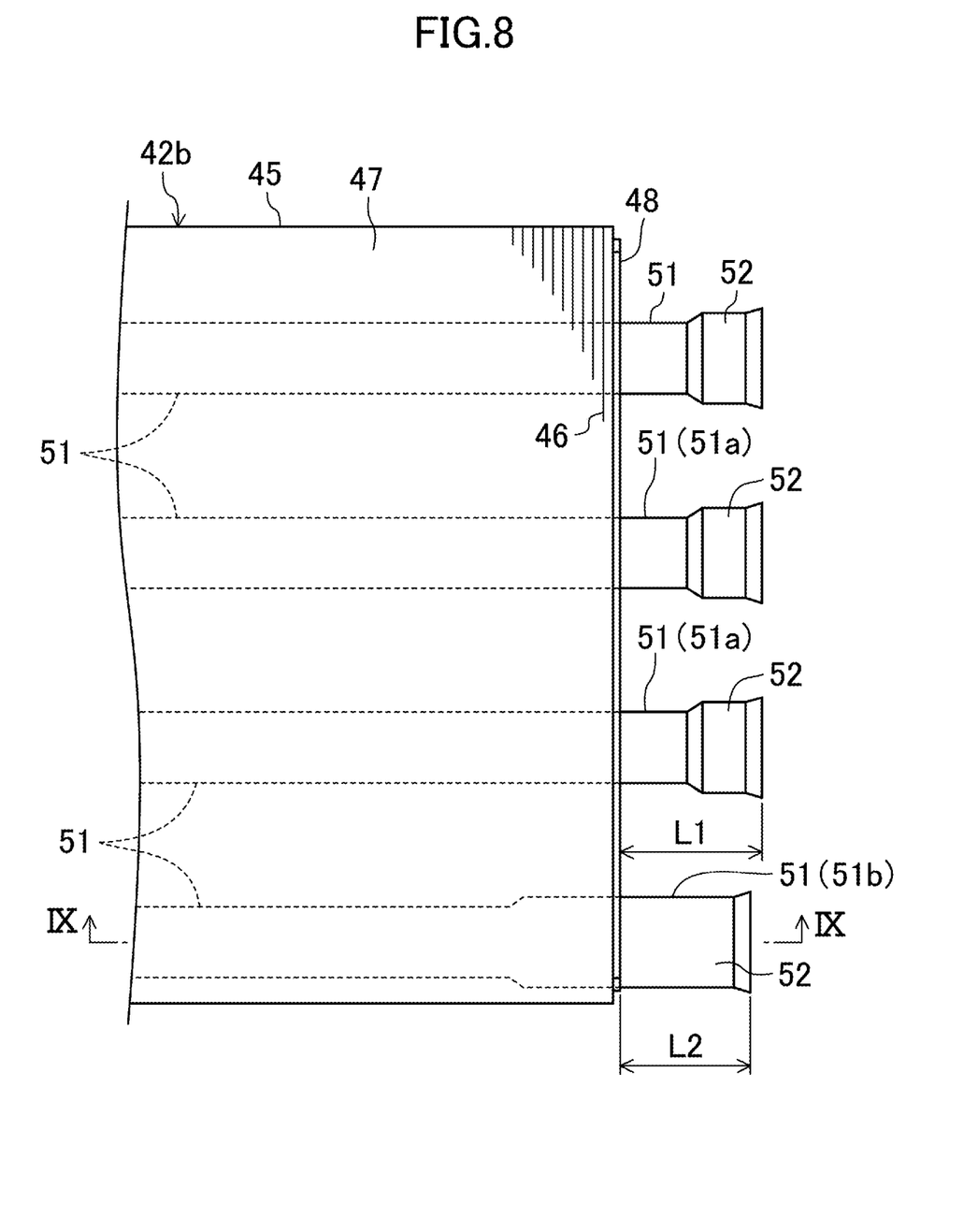
FIG. 8 is a plan view of a main portion of an auxiliary heat exchange unit of a second heat exchange unit in the indoor heat exchanger.

As illustrated in FIG. 8, in the auxiliary heat exchange unit (42*b*) of the second heat exchange unit (42), a distance L2 from the tip end of the second protrusion (51*b*) to the support plate (48) is shorter than a distance from the tip end of the protrusion (51) other than the second protrusion (51*b*) to the support plate. Thus, the distance L2 from the tip end of the second protrusion (51*b*) to the support plate (48) is shorter than a distance L1 from the tip end of the first protrusion (51*a*) to the support plate (48) (L2<L1). In other words, the second protrusion (51*b*) is shorter than the first protrusion (51*a*).

Although not illustrated, in each of the first heat exchange unit (41), the main heat exchange unit (42*a*) of the second heat exchange unit (42), and the main heat exchange unit (43*a*) of the third heat exchange unit (43) in each of which the second protrusion (51*b*) to which corresponding one of the gas-side branch pipes (77*a* to 77*c*) is joined is present, the distance L2 from the tip end of the second protrusion (51*b*) to the support plate (48) is shorter than the distance from the tip end of the protrusion (51) other than the second protrusion (51*b*) to the support plate (48). Thus, in each of the first heat exchange unit (41), the main heat exchange unit (42*a*) of the second heat exchange unit (42), and the main heat exchange unit (43*a*) of the third heat exchange unit (43), the distance L2 from the tip end of the second protrusion (51*b*) to the support plate (48) is shorter than the distance L1 from the tip end of the first protrusion (51*a*) to the support plate (48) (L2<L1). In other words, the second protrusion (51*b*) is shorter than the first protrusion (51*a*).

<Diameter-Enlarged Portion>

Each heat transfer tube (50) has, as a diameter-enlarged portion (52), a portion extending from the opening end thereof by a predetermined length. The outer diameter of the diameter-enlarged portion (52) is greater than the outer diameters of portions of the heat transfer tube (50) other than the diameter-enlarged portion (52). Moreover, the inner diameter of the diameter-enlarged portion (52) is greater than the inner diameters of portions of the heat transfer tube (50) other than the diameter-enlarged portion (52).

As illustrated in FIG. 8, the length of the diameter-enlarged portion (52) is shorter than the length of the protrusion (51) at the end portion of the heat transfer tube (50) forming the protrusion (51) other than the second protrusion (51*b*). Thus, at the end portion of the heat transfer tube (50) forming the protrusion (51) other than the second protrusion (51*b*), the entire diameter-enlarged portion (52) is exposed to the outside of the fin group (47). The protrusion (51) other than the second protrusion (51*b*) includes the first protrusion (51*a*).

Figure 9:
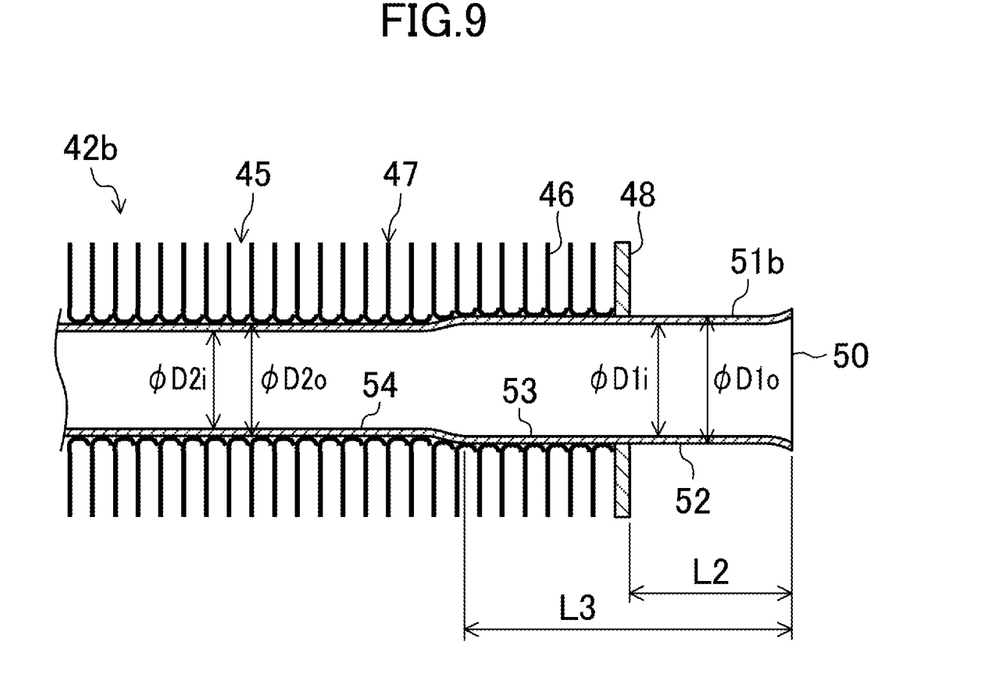
FIG. 9 is a cross-sectional view taken along line IX-IX of FIG. 8.

As illustrated in FIG. 9, at the end portion of the heat transfer tube (50) forming the second protrusion (51*b*), the length L3 of the diameter-enlarged portion (52) is longer than the length L2 of the second protrusion (51*b*). Thus, at the end portion of the heat transfer tube (50) forming the second protrusion (51*b*), part of the diameter-enlarged portion (52) is exposed to the outside of the fin group (47), and the remaining part of the diameter-enlarged portion (52) is positioned inside the fin group (47).

Specifically, in the heat transfer tube (50) having the second protrusion (51*b*), the entire second protrusion (51*b*) and the entire first portion (53) contacting the fin (46) is the diameter-enlarged portion (52). One end of the first portion (53) is continuous with the second protrusion (51*b*). In the heat transfer tube (50) having the second protrusion (51*b*), a portion continuous with the other end of the first portion (53) is a second portion (54). The outer diameter D1$o$ of the diameter-enlarged portion (52) formed by the second protrusion (51*b*) and the first portion (53) is greater than the outer diameter D2$o$ of the second portion (54) (D2$o$<D1$o$). The inner diameter D1$i$ of the diameter-enlarged portion (52) formed by the second protrusion (51*b*) and the first portion (53) is greater than the inner diameter D2$i$ of the second portion (54) (D2$i$<D1$i$).

Although FIG. 9 illustrates the second protrusion (51*b*) of the auxiliary heat exchange unit (42*b*) of the second heat exchange unit (42), the other second protrusions (51*b*) have the same shape as that of the second protrusion (51*b*) illustrated in FIG. 9.

<End Portion of Second Connection Pipe>

In the indoor heat exchanger (30) of one or more embodiments, the liquid-side connection pipe (63) and the first to third gas-side branch pipes (77*a* to 77*c*) form the second connection pipe (62).

Figure 10:
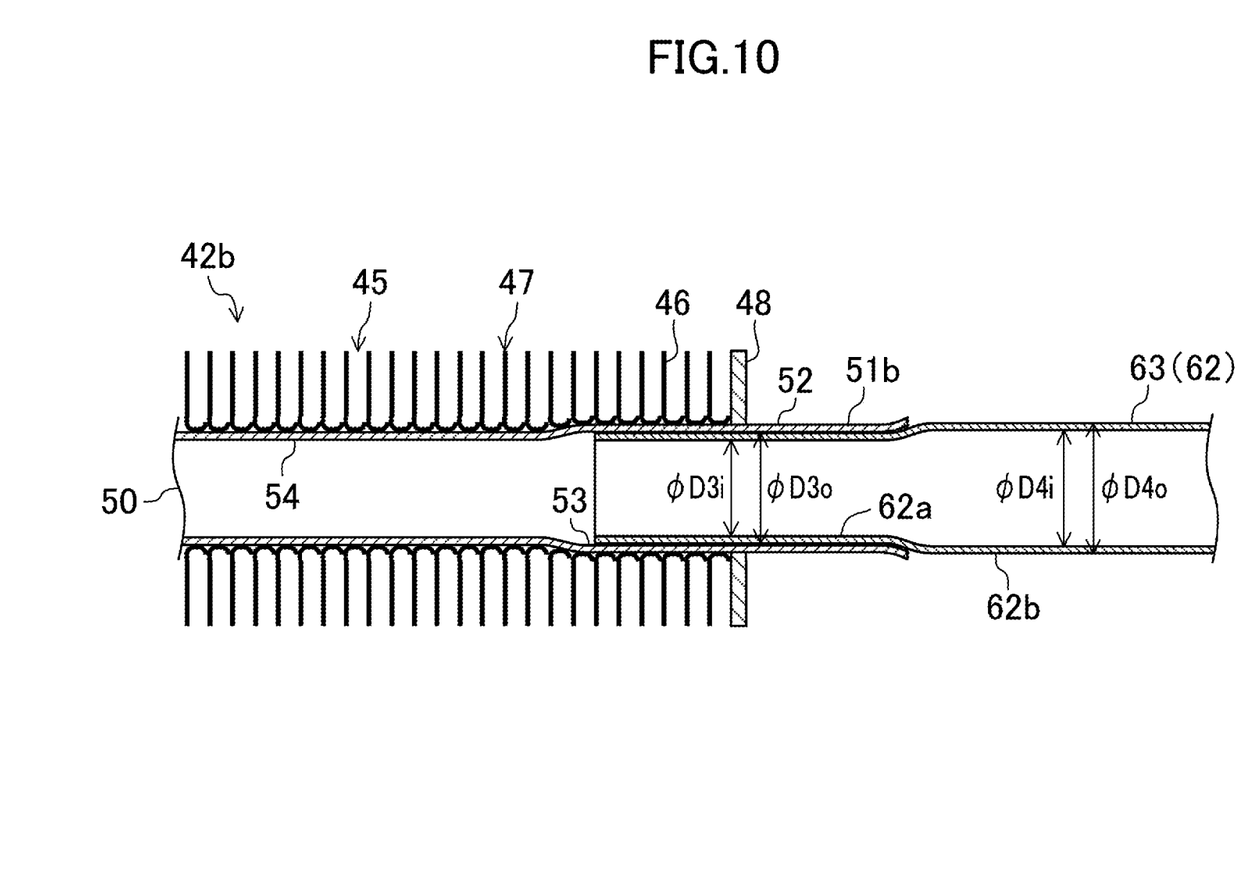
FIG. 10 is a cross-sectional view of a second protrusion of the indoor heat exchanger and a second connection pipe joined to the second protrusion.

As illustrated in FIG. 10, each of the end portions of the liquid-side connection pipe (63) and the first to third gas-side branch pipes (77*a* to 77*c*) forming the second connection pipe (62) is an insertion portion (62*a*) entering the second protrusion (51*b*). The insertion portion (62*a*) of the second connection pipe (62) is inserted into the diameter-enlarged portion (52) formed in the heat transfer tube (50). The tip end of the insertion portion (62*a*) is positioned on the side of the fin group (47) with respect to the support plate (48). In other words, the tip end of the insertion portion (62*a*) is positioned inside the fin group (47). Thus, the insertion portion (62*a*) is joined to the entire inner surface of the second protrusion (51*b*) by brazing.

In each of the liquid-side connection pipe (63) and the first to third gas-side branch pipes (77*a* to 77*c*) forming the second connection pipe (62), a portion formed continuous with the insertion portion (62*a*) and positioned outside the second protrusion (51*b*) is an exposed portion (62*b*). The outer diameter D3$o$ of the insertion portion (62*a*) is less than the outer diameter D4$o$ of the exposed portion (62*b*)

(D3o<D4o). The inner diameter D3i of the insertion portion (62a) is less than the inner diameter D4i of the exposed portion (62b) (D3i<D4i).

Although FIG. 10 illustrates the insertion portion (62a) and exposed portion (62b) of the liquid-side connection pipe (63), the insertion portion (62a) and the exposed portion (62b) are also formed in each of the first to third gas-side branch pipes (77a to 77c). The shapes of the insertion portion (62a) and exposed portion (62b) of each of the first to third gas-side branch pipes (77a to 77c) are the same as the shapes of the insertion portion (62a) and exposed portion (62b) of the liquid-side connection pipe (63) illustrated in FIG. 10.

—Feature (1) of Embodiments—

As described above, in the indoor heat exchanger (30) of one or more embodiments, the end portions of the plurality of heat transfer tubes (50) form the protrusions (51) protruding from the support plate (48). The protrusions (51) include the first protrusion (51a) and the second protrusion (51b). The first protrusion (51a) is connected to the protrusion (51) positioned adjacent to the first protrusion (51a). The second protrusion (51b) is connected to the flow path pipe (65) different from the "protrusion (51) positioned adjacent to the second protrusion (51b)."

Here, the "protrusion (51) positioned adjacent to the first protrusion (51a)," to which the first protrusion (51a) is connected is not displaceable relative to the fin group (47). Thus, in the indoor heat exchanger (30), great external force is less likely to act on the first protrusion (51a). On the other hand, the flow path pipe (65) to which the second protrusion (51b) is connected is displaceable relative to the fin group (47). When the flow path pipe (65) is displaced, relatively great external force acts on the second protrusion (51b) which is part of the heat transfer tube (50) fixed to the fin group (47).

The maximum external force which can act on the second protrusion (51b) is greater than the maximum external force which can act on the first protrusion (51a). On the other hand, in the indoor heat exchanger (30) of one or more embodiments, the distance L2 from the tip end of the second protrusion (51b) to the support plate (48) is shorter than the distance L1 from the tip end of the first protrusion (51a) to the support plate (48). Thus, the rigidity of the second protrusion (51b) is higher than the rigidity of the first protrusion (51a). Moreover, the strength of the second protrusion (51b) is higher than the strength of the first protrusion (51a). Thus, according to one or more embodiments, the strength of the second protrusion (51b) can be increased, and a probability of the second protrusion (51b) being deformed due to the action of the external force can be reduced. This can improve the reliability of the indoor heat exchanger (30).

In the indoor heat exchanger (30) of one or more embodiments, the bottom thickness of the heat transfer tube (50) is less than the thicknesses of the U-shaped connection pipe (61), the liquid-side connection pipe (63), the bridging pipe (64), the liquid-side branch pipes (72a to 72c), and the first to third gas-side branch pipes (77a to 77c). According to one or more embodiments, the rigidity and strength of the second protrusion (51b) formed of the heat transfer tube (50) having a relatively small bottom thickness can be improved by shortening the length of the second protrusion (51b). Thus, according to one or more embodiments, the strength of the second protrusion (51b) formed of the heat transfer tube (50) having the relatively small bottom thickness can be increased, and the reliability of the indoor heat exchanger (30) can be improved.

—Feature (2) of Embodiments—

In the indoor heat exchanger (30) of one or more embodiments, the diameter-enlarged portion (52) is formed at the portion of the heat transfer tube (50) including the second protrusion (51b). The length L3 of the diameter-enlarged portion (52) is longer than the length L2 of the second protrusion (51b) (see FIG. 9). Thus, in the heat transfer tube (50) having the second protrusion (51b), part of the diameter-enlarged portion (52) is exposed to the outside of the fin group (47), and the remaining part of the diameter-enlarged portion (52) is positioned inside the fin group (47).

In the indoor heat exchanger (30) of one or more embodiments, the insertion portion (62a) of each of the liquid-side connection pipe (63) and the first to third gas-side branch pipes (77a to 77c) forming the second connection pipe (62) enters the diameter-enlarged portion (52) formed in the heat transfer tube (50). The tip end of the insertion portion (62a) is positioned on the side of the fin group (47) with respect to the support plate (48). The inner surface of each of the second protrusion (51b) and the first portion (53) forming the diameter-enlarged portion (52) is joined to the outer surface of the insertion portion (62a) of the second connection pipe (62) by brazing.

In the indoor heat exchanger (30) of one or more embodiments, the second protrusion (51b) and the first portion (53) forming the diameter-enlarged portion (52) are joined to the insertion portion (62a) of the second connection pipe (62) by brazing, thereby achieving reinforcement. Thus, according to one or more embodiments, the strength of the second protrusion (51b) can be increased, and a probability of the second protrusion (51b) being deformed due to the action of the external force can be reduced. This can improve the reliability of the indoor heat exchanger (30).

—Feature (3) of Embodiments—

In the indoor heat exchanger (30) of one or more embodiments, each of the liquid-side connection pipe (63) and the first to third gas-side branch pipes (77a to 77c) forming the second connection pipe (62) has the insertion portion (62a) and the exposed portion (62b), and the insertion portion (62a) has the outer and inner diameters less than those of the exposed portion (62b). Thus, according to one or more embodiments, the exposed portion (62b) of the second connection pipe (62) can be formed with a great inner diameter. As a result, a pressure loss in the refrigerant flowing through the indoor heat exchanger (30) can be suppressed low.

—Variations of Embodiments—

The air-conditioning apparatus (10) of the above-described embodiments may be modified in the following manner. The following variations may be combined or replaced as needed, as long as the functions of the air-conditioning apparatus (10) are not impaired.

In the indoor heat exchanger (30) of one or more embodiments, the protrusion (51) to which the bridging pipe (64) is joined may form the second protrusion (51b). The second protrusion (51b) joined to one end of the bridging pipe (64) is connected to the protrusion (51) different from the "protrusion (51) positioned adjacent to the second protrusion (51b)" via the bridging pipe (64). In this case, the heat transfer tube (50) having the "protrusion (51) joined to the other end of the bridging pipe (64)" forms the flow path pipe (65). The "distance from the second protrusion (51b) to the flow path pipe (65)" is longer than the "distance from the second protrusion (51b) to the protrusion (51) positioned adjacent to the second protrusion (51b)."

In the indoor heat exchanger (30) of one or more embodiments, the liquid-side pipe (32) is connected to the second protrusion (51b) via the liquid-side connection pipe (63), but may be directly connected to the second protrusion (51b). In this case, the liquid-side pipe (32) forming the flow path pipe (65) is joined to the second protrusion (51b) by brazing.

In one or more embodiments, the material of the heat transfer tube (50) of the indoor heat exchanger (30) may be copper or copper alloy. In this case, the materials of the U-shaped connection pipe (61), the liquid-side connection pipe (63), the bridging pipe (64), the liquid-side trunk pipe (71), the liquid-side branch pipes (72a to 72c), the gas-side trunk pipe (76), the gas-side branch pipes (77a to 77c), the liquid-side pipe (32), and the gas-side pipe (33) provided for the indoor heat exchanger (30) may also be copper or copper alloy. The material of the heat transfer tube of the outdoor heat exchanger (27) may be aluminum, aluminum alloy, copper, or copper alloy.

The indoor unit (13) provided with the indoor heat exchanger (30) to which the present disclosure is applied is not limited to the wall-mounted type, and may be, for example, a ceiling-mounted type.

The heat exchanger to which the present disclosure is applied is not limited to the indoor heat exchanger (30). The present disclosure may be applied to the outdoor heat exchanger (27). In this case, protrusions of a plurality of heat transfer tubes forming the outdoor heat exchanger (27) include a first protrusion (51a) and a second protrusion (51b).

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims. In addition, the expressions of "first," "second," "third," . . . , in the specification and claims are used to distinguish the terms to which these expressions are given, and do not limit the number and order of the terms.

As described above, the present disclosure is useful for a heat exchanger and an air-conditioning apparatus.

REFERENCE SIGNS LIST

10 Air-conditioning apparatus
30 Indoor Heat Exchanger (Heat Exchanger)
46 Fin
47 Fin Group
48 Support Plate
50 Heat Transfer Tube
51 Protrusion
51a First Protrusion
51b Second Protrusion
53 First Portion
54 Second Portion
61 U-Shaped Connection Pipe (First Connection Pipe)
62 Second Connection Pipe
62a Insertion Portion
62b Exposed Portion
65 Flow Path Pipe

What is claimed is:

1. A heat exchanger comprising:
a fin group including plate-shaped fins;
heat transfer tubes penetrating the plate-shaped fins; and
a support plate at an end of the fin group, wherein
the heat transfer tubes penetrate the support plate,
the heat exchanger is configured to cause a heat medium flowing through the heat transfer tubes to exchange heat with air,
end portions of the heat transfer tubes form protrusions protruding from the support plate,
the protrusions include:
a first protrusion connected to one of the protrusions adjacent to the first protrusion; and
a second protrusion connected to a flow path pipe different from one of the protrusions adjacent to the second protrusion, and
a distance from a tip end of the second protrusion to the support plate is shorter than a distance from a tip end of the first protrusion to the support plate.

2. The heat exchanger of claim 1, wherein a material of the heat transfer tubes is either aluminum or aluminum alloy.

3. The heat exchanger of claim 1, wherein the protrusions that include the first protrusion and the second protrusion are disposed on a line along edges of the plate-shaped fins.

4. The heat exchanger of claim 1, further comprising:
a first connection pipe having:
a first end joined to the first protrusion; and
a second end joined to one of the protrusions adjacent to the first protrusion.

5. The heat exchanger of claim 1, wherein the flow path pipe is displaceable relative to the fin group.

6. The heat exchanger of claim 1, wherein
the fin group, the heat transfer tubes, and the support plate form a main body, and
the heat exchanger further comprises a second connection pipe through which:
a heat medium flowing into the main body, or
a heat medium having flowed out of the main body flows, and
one end of the second connection pipe is joined to the second protrusion.

7. The heat exchanger of claim 1, wherein
one of the heat transfer tubes that forms the second protrusion comprises:
a first portion that contacts the plate-shaped fins; and
a second portion that contacts the plate-shaped fins,
a first end of the first portion is continuous with the second protrusion,
an end of the second portion is continuous with a second end of the first portion,
outer diameters of the second protrusion and the first portion are greater than an outer diameter of the second portion, and
inner diameters of the second protrusion and the first portion are greater than an inner diameter of the second portion.

8. The heat exchanger of claim 1, further comprising:
a second connection pipe connected to the second protrusion and that comprises an insertion portion entering the second protrusion, wherein
a tip end of the insertion portion is disposed on a side of the fin group with respect to the support plate.

9. The heat exchanger of claim 8, wherein
the second connection pipe comprises an exposed portion outside the second protrusion,
an outer diameter of the insertion portion is less than an outer diameter of the exposed portion, and
an inner diameter of the insertion portion is less than an inner diameter of the exposed portion.

10. An air-conditioning apparatus comprising the heat exchanger of claim 1.

* * * * *